United States Patent [19]

Yagasaki et al.

[11] Patent Number: 4,696,873
[45] Date of Patent: Sep. 29, 1987

[54] RECHARGEABLE ELECTROCHEMICAL CELL WITH A NEGATIVE ELECTRODE COMPRISING A HYDROGEN ABSORBING ALLOY INCLUDING RARE EARTH COMPONENT

[75] Inventors: Eriko Yagasaki, Tokyo; Motoya Kanda, Yokohama; Kiyoshi Mitsuyasu, Yokohama; Yuji Sato, Yokohama, all of Japan

[73] Assignee: Kabushiki Kaisha Toshiba, Kawasaki, Japan

[21] Appl. No.: 872,844

[22] Filed: Jun. 11, 1986

[30] Foreign Application Priority Data

Jun. 21, 1985 [JP] Japan .................................. 60-133985
Mar. 26, 1986 [JP] Japan .................................. 61-65877
May 13, 1986 [JP] Japan .................................. 61-107614

[51] Int. Cl.$^4$ ........................................... H01M 10/52
[52] U.S. Cl. ...................................... 429/59; 429/218; 252/521
[58] Field of Search ............... 429/57, 59, 218, 40, 429/206; 420/900, 416, 580; 252/182.1, 519-521

[56] References Cited

U.S. PATENT DOCUMENTS

| | | | |
|---|---|---|---|
| 3,669,745 | 6/1972 | Beccu | 429/218 X |
| 3,980,501 | 9/1976 | Feder et al. | 429/218 X |
| 4,024,322 | 5/1977 | McKaveney | 429/218 X |
| 4,107,405 | 8/1978 | Percheron et al. | 429/218 |
| 4,216,274 | 8/1980 | Bruning et al. | 429/57 |
| 4,292,209 | 9/1981 | Marchant | 429/218 X |
| 4,487,817 | 12/1984 | Willems et al. | 429/27 |
| 4,605,603 | 8/1986 | Kanda et al. | 429/57 X |

*Primary Examiner*—Anthony Skapars
*Attorney, Agent, or Firm*—Oblon, Fisher, Spivak, McClelland, & Maier

[57] ABSTRACT

A rechargeable electrochemical cell a positive electrode, an alkaline electrolyte and a negative electrode made mainly of a hydrogen absorbing alloy containing a mixture of at least two rare earth elements including Ce whose content relative to the total amount of rare earth elements is less than 40 wt % and is preferably 0.1 wt % to 12 wt % or in the range 0.1-8 wt %, which gives still better capacity and life characteristics. Moreover, larger capacity characteristics can be obtained if the negative electrode contains a conductive powder preferably with an average particle diameter of 10 μm or less as a subsidiary material.

39 Claims, 8 Drawing Figures

RECHARGEABLE ELECTROCHEMICAL CELL WITH A NEGATIVE ELECTRODE COMPRISING A HYDROGEN ABSORBING ALLOY INCLUDING RARE EARTH COMPONENT

BACKGROUND OF THE INVENTION

The present invention relates to a rechargeable electrochemical cell with a hydrogen electrode as a negative electrode. More particularly, the invention relates to a electrochemical cell which is suitable as a secondary cell and in which a hydrogen negative electrode is comprised by a hydrogen absorbing alloy including rare earth elements as constituents.

There is, by way of a rechargeable electrochemical cell comprising hydrogen absorbing alloy as a negative electrode, a sealed secondary cell with a negative electrode constituted by $LaNi_5$ such as disclosed in U.S. Pat. No. 3,874,928, for example. However, although use of the element La as the rare earth component of the hydrogen absorbing alloy used for the negative electrode offers the promise of superior secondary cell performance (ability to achieve high energy density and good efficiency since the amount of charge relative to volume can be made greater, etc.), the cell is not practical, because La is very expensive and so the cost of the manufactured cell is high. Further, the electrochemical capacity of the manufactured cell becomes low at room temperature since the hydrogen equilibrium pressure above $LaNi_5$ is higher than atmospheric pressure at the temperature. It also results in the higher internal pressure of the cell than atmospheric pressure at room temperature which not only means that the cell case must be constructed strongly but also causes some problems; a lack of safety, a loss of the electrochemical capacity and self-discharge because of leakage of hydrogen gas.

There are examples of use of Mm (mischmetal: a mixture of rare earth elements containing 40-50 wt % of Ce and 20-40 wt % of La), which is much cheaper than pure lanthanum, as the rare earth component and of substitution of a portion of Ni with other elements in order to lower the equilibrium pressure. For example, the alkaline storage cell disclosed in Japanese Patent Disclosure No. 60-250558 consists of a negative electrode comprising a hydrogen absorbing alloy constituted by Mm, Ni, Co and Mk (Mm being a commercially available mischmetal (40 wt % La, 40 wt % Ce, 14 wt % Nd, 4 wt % Pr and other elements) and Mk at least one of the elements selected from the group consisting of Al, Sn, Cu, Fe, Mn, Cr, Mo, V, Nb, Ta, Zn and Mg), a positive electrode, a separator and an alkaline electrolyte.

A secondary cell which employs such a hydrogen absorbing alloy using conventional Mm as mentioned above as an essential material to the negative electrode can be manufactured at comparatively low price. However, although it keeps a large capacity and no production of gaseous hydrogen is observed initially, there are considerable restrictions on use of the cell since its life as a cell (the number of cycles of charging and discharging until the discharged capacity decreases below a prescribed quantity and the cell is no longer serviceable for practical purposes) is finished in a small number of charge-discharge repetitions. For example, with a cell capable discharge 100% of the charged capacity in the initial period, the discharged capacity decreases to 80% after about 100 charge-discharge cycles and to about 50% after about 150 charge-discharge cycles, which makes it difficult to apply such a cell to practical use. This is the result that the hydrogen absorbing alloy constituting the negative electrode is chemically unstable in an electrolyte in charge-discharge cycles, and therefore the chemical stability of the ally must be improved in order to increase the cycle life of the cell.

SUMMARY OF THE INVENTION

The object of the present invention is to provide a long-life rechargeable electrochemical cell with a negative electrode comprising a hydrogen absorbing alloy which can be manufactured at low cost and whose electrochemical capacity does not decrease even after a number of charging and discharging cycles.

According to the invention, this object is achieved by means of a rechargeable electrochemical cell comprising a positive electrode, an alkaline electrolyte, a separator and a negative electrode constituted mainly by the hydrogen absorbing alloy containing a mixture of at least two rare earth elements including Ce as a rare earth component in which the Ce content is less than 40 wt % relative to the total amount of rare earth elements. It is particularly suitable to use a mixture of rare earth elements prepared from ordinary mischmetal from which Ce has been partially removed to make the Ce content less than 40 wt % relative to the total amount of the rare earth elements as the rare earth component of a hydrogen absorbing alloy, since it permits easy manufacture at low cost. The Ce content in this case is preferably 0.1-12 wt % relative to the total amount of the rare earth elements, since making it this value improves the cell characteristics. The optimum range is 0.1-8 wt %.

The rare earth component of the hydrogen absorbing alloy constituting the material of the negative electrode in the cell according to the invention can be easily manufactured by, for example, effecting removal of a certain amount (partial removal) of Ce from the raw materials during the process of produce of commercial mischmetal (containing 40-50 wt % of Ce). In more detail, on roasting of naturally produced, refined bastnaesite or monazite, etc., only Ce can become a quadrivalent oxide, while the other rare earth elements become trivalent oxides, and so hydrochloric acid extraction of the oxides results in precipitation only of Ce, which can easily be separated by filtering. Rare earth elements which include a small amount of Ce contained in the resulting solution are precipitated as hydroxides by $NH_4OH$, etc., and converted into chlorides and fluorides, which give a mixture of rare earth elements by molten salt electrolysis. The amount of Ce can be regulated by suitable setting of the oxidation time. It is not desirable to make the Ce content less than 0.1 wt %, since this requires that no trivalent Ce oxide remains in the roasted oxides, which demands repeated roasting, a little at a time, over a long period. Therefore the separation process of Ce becomes complicated and the electrode material becomes too expensive.

The preferred composition range of the hydrogen absorbing alloy constituting the main material for the negative electrode is one consisting of Ni, Co, Mn and a rare earth component M which is a mixture of rare earth elements in which the Ce content is less than 40 wt % relative to the total amount of rare earth elements, which is represented in the following formula.

$MNi_uCo_vMn_w$          Formula 1

(where u, v and w represent atomic quantities per 1 gram atom of the rare earth component M and satisfy the following relations $$2.2 \leq u \leq 4.8$$

$$0.01 < v \leq 1.5$$

$$0.01 < w \leq 1.2$$

$$4.8 \leq u+v+w \leq 5.4)$$

A rechargeable electrochemical cell with the excellent characteristics of large capacity and long life is obtained when its negative electrode comprises hydrogen absorbing alloy having the composition mentioned above as its main material. The hydrogen absorbing alloy with the composition of Formula 1 permits the equilibrium plateau pressure to be lowered without reduction of the amount of absorbable hydrogen since it contains suitable quantities of Co and Mn. As regards the total amount of components other than rare earth component M, alloys with compositions outside the range $4.8 \leq u+v+w \leq 5.4$ are undesirable, since there is reduction of the amount of absorbable hydrogen because the structure becomes considerably distorted relative to a structure of the typical hydrogen absorbing alloy LaN$_5$. As far as concerns the Ni content, the amount of absorbable hydrogen is reduced when $u<2.2$, while there is a problem of a rise in the equilibrium plateau pressure at $4.8<u$. The Mn content needs to be in the range $0.01<w\leq 1.2$, since an excess, at $1.2<w$, leads to a reduction in the amount of absorbable hydrogen, while only a very small amount of Mn, i.e., $w \leq 0.01$, results in a failure to achieve satisfactory effects from the inclusion of Mn. Further, conditioning processing is easier with an electrode comprising a hydrogen absorbing alloy containing Mn in the range of Formula 1 than that including no Mn. There is also reduction of the amount of absorbable hydrogen if the Co content is such that $1.5<v$, while if only a very small amount of Co is included, i.e., if $v \leq 0.01$, there is failure to get proper advantage of the effects of including Co. For the above reason, the content quantities of the various components are preferably in ranges such that all the values u, v and w of Formula 1 are satisfied. An electrochemical cell with a large capacity and excellent safety characteristics can be obtained if its negative electrode comprises a hydrogen absorbing alloy.

A large capacity and excellent life characteristics of a rechargeable electrochemical cell are obtained if its negative electrode comprises a hydrogen absorbing alloy having a composition represented in the following formula:

    Formula 2

(where x, y and z represent atomic quantities per 1 gram atom of the rare earth component M and satisfy the following relations $$2.2 \leq x \leq 4.8$$

$$0.01 < y \leq 2.0$$

$$0.01 < z \leq 0.6$$

$$4.8 \leq x+y+z \leq 5.4),$$

in which a rare earth component M consists of a mixture of rare earth elements including Ce whose content is less than 40 wt % relative to the total amount of rare earth elements, in which A consists of one or both the elements Ni and Co which are suitable as metal components for forming an alloy with the rare earth component and producing a lattice structure that permits absorption and desorption of hydrogen, in which B consists of at least one of the elements Cu, Fe and Mn which are suitable as components for maintaining the amount of absorbable hydrogen and lowering the equilibrium plateau pressure by substituting a portion of the element or elements in A, and in which C consists of at least one element selected from the group consisting of Al, Cr, Si, Ti, V and Sn which are suitable for lowering the equilibrium plateau pressure and preventing electrode corrosion and for increasing cycle life of the cell by stabilizing the alloy structure in charge-discharge cycles.

Although the characteristics of this cell vary depending on what component elements are selected from among the elements A, B and C, a large capacity and excellent life characteristics of the electrochemical cell can be achieved by means of a negative electrode constituted using a hydrogen absorbing alloy having the composition within the range of the above formula.

The restriction of the Ce content to the range noted above is still effective, though whichever elements are selected from those mentioned above as components A, B and C. That is, when the composition of the hydrogen absorbing alloy is in the range of Formula 2, it is satisfactory as long as the Ce content in M is less than 40 wt %, preferably 12 wt % or less, as this gives excellent capacity and life characteristics and permits low-cost manufacture. It is impracticable to make the Ce content less than 0.1 wt % since it requires repeated operations for removing Ce and results in the material being expensive. Still greater increase of cycle life of the cell can be achieved by making the Ce content 8 wt % or less.

Element A can be Ni alone, both Ni and Co or Co alone. With a large amount of Ni, the amount of absorbable hydrogen and hence the electrode capacity tend to be greater and the cell voltage also becomes higher. On the other hand, with a large amount of Co, the equilibrium plateau pressure is lowered and the cycle life of the cell is extended though the reduction of the amount of absorbable hydrogen and the electrochemical capacity sometimes occur. The amounts of Ni and Co constituting the component A can therefore be determined having reference to the terminal voltage, electrochemical capacity and cycle life characteristics required for the target cell.

The quantity x of element A should not be less than the lower limit of 2.2, since the amount of absorbable hydrogen and the electrochemical capacity are reduced if the electrochemical is made using the material of $x<2.2$. If x exceeds 4.8, there can be problems of insufficient capacity, production of gaseous hydrogen and a rise in the internal pressure, since the equilibrium plateau pressure becomes high when Ni represents the greater proportion of element A and the amount of absorbable hydrogen reduces when Co represents the greater proportion.

Whatever the element used for the component B, too small inclusion of B has no effects in the performance as the cell electrode if the value of Y is 0.01 or less, and it is undesirable for excess inclusion, with the value of y more than 2.0, since in this case there is insufficient electrode capacity because of the reduction of the amount of absorbable hydrogen.

If the quantity z of the component C is 0.01 or less, the electrode life is shorter, while if there is an excess, with x greater than 0.6, the electrochemical capacity of the electrode becomes insufficient because of reduction of the amount of absorbable hydrogen. The range is therefore suitably $0.01 < z \leq 0.6$. If the total amount $(x+y+z)$ of components other than the rare earth component is outside the range $4.8 \leq x+y+z \leq 5.4$, an alloy lattice structure permitting absorption and desorption of hydrogen fails to be produced throughout the whole of the alloy phase, which results in a partial structure capable of only little hydrogen absorption or a metal phase which does not absorb hydrogen, leading to a reduction of the electrochemical capacity and to the shortening of the cycle life of the electrode since charge-discharge repetitions are accompanied by segregation of components from the portions of the imperfect lattice structure.

For the above reasons, therefore, the composition of the $MA_xB_yC_z$ alloy suitably has the values $2.2 \leq x \leq 4.8$, $0.01 < y \leq 2.0$, $0.01 < z \leq 0.6$ and $4.8 \leq x+y+z \leq 5.4$ and the alloy composition constituting the negative electrode material can be selected within this range having reference to the capacity and life characteristics of the target electrochemical cell.

The hydrogen absorbing alloy constituting the material for the negative electrode of an electrochemical cell according to the invention may be produced by mixing suitable quantities of a powdered mixture of rare earth elements containing a set amount of Ce and other powdered relevant elements selected in accordance with the target composition and melting the powder mixture in a vacuum arc furnace, for example, to give in the form of a uniform solid solution. This solid solution can easily be prepared as a powdered body by pulverization or by being given activation treatment such as being left in a hydrogen atmosphere at room temperature and around 10 kg/cm².

The negative electrode employed in the rechargeable electrochemical cell of the invention may be a sheet electrode formed by mixing the abovenoted alloy powder that can absorb and desorb hydrogen which is the active substance of the negative electrode and a binder such as polytetrafluoroethylene (PTFE), for example, and then making the mixture into a sheet. The hydrogen absorbing alloy forming the negative electrode may be used in a state in which it has desorbed hydrogen or in a state in which it has partially absorbed hydrogen. The positive electrode is, for example, a nickel oxide (NiOOH) electrode produced by impregnation of a metallic nickel sintered body with nickel hydroxide (Ni(OH)₂) and formation. The positive electrode and negative electrode are insulated by a separator of nylon or propylene, for example, and then immersed in an electrolyte constituted by an aqueous solution of KOH, NaOH, etc. to form a rechargeable electrochemical cell according to the invention.

A more specifically good performance of a cell in its electrochemical capacity and cycle life is achieved if the main material of the negative electrode is constituted by a more preferred hydrogen absorbing alloy represented the following formula $$MNi_qCo_rMn_sC_t \qquad \text{Formula 3}$$

(where q, r, s and t represent atomic quantities per 1 gram atom of the rare earth component M which satisfy the following relations $$3.5 < q \leq 4.6$$

$$0.01 < r \leq 1.5$$

$$0.01 < s \leq 1.2$$

$$0.01 < t \leq 0.6$$

$$x = q + r$$

$$3.51 < x \leq 4.8$$

$$4.8 \leq q+r+s+t \leq 5.4,$$

in which a rare earth component M consists of a mixture of rare earth elements including Ce and La, etc. and in which the Ce content is less than 40 wt % relative to the total amount of rare earth elements, and in which an element C consists of at least one element selected from the group consisting of Al, Cr, Ti, V and Sn.

The determination of the composition range of Formula 3 is based on reasons similar to those applying for the abovenoted Formula 1 and Formula 2. In particular Ni content must be made greater than in the compositions of Formula 1 and Formula 2 in order to avoid deterioration of characteristics at the time of initial formation, which is suitably made $3.5 < q$, in the case of using an $MNi_qCo_rMn_sC_t$ alloy as a main material of the negative electrode for a large electrochemical capacity of the cell. It is necessary for the total amount of components other than the rare earth component M to be in the range $4.8 \leq q+r+s+t \leq 5.4$ for reasons similar to the reasons which were discussed in detail in reference to the formulas noted earlier and for which the range $4.8 \leq u+v+w \leq 5.4$ is suitable. The amounts of the various components are determined within this range, taking into account of the capacity and cycle life characteristics of the target electrochemical cell. If it is required to increase the cycle life of the cell, Al is particularly suitable as element C.

In addition, the composition of alloys used as materials of the electrodes in the cell according to the present invention does not remove unavoidable impurities which are included while a manufacturing process. According to the place of origin of the material, Fe is sometimes included as an unavoidable impurity. The composition may be mixed up with impurities from the furnance and/or the bessel while preparing alloys.

A still more suitable structure for a rechargeable electrochemical cell according to the invention can be obtained if the negative electrode contains a conductive powder with an average particle diameter of 10 μm or less as a subsidiary material and a hydrogen absorbing alloy powder with a suitable Ce content and a composition as described above as a main material.

Electrodes made of hydrogen absorbing alloys are normally formed by sintering a hydrogen absorbing alloy powder or by binding using polymer material, but with a hydrogen absorbing alloy electrode with these structures the electrochemical capacity is in many cases less than the theoretical capacity calculated from the amount of absorbable hydrogen since there is incomplete contact between alloy particles. Such electrically unconnected alloy particles can neither absorb nor desorb hydrogen, in other words they can be neither charged nor discharged, thus they make no contribution at all to the capacity of the electrode. The inclusion of the abovenoted conductive powder is made in order to resolve this problem. More specifically, it is necessary for the average particle diameter of the conductive powder to be 10 μm or less. When a hydrogen absorbing alloy is subjected to hydrogen activation and made a powder, its particle diameter is approximately 2-70 μm, with the average particle diameter being 20-30 μm. In the case of mechanical pulverization is effected, when charging and discharge are effected following formation of an electrode and constitution as an electrochemical cell, the alloy particles have the same average particle diameter as when conversion to fine powder by hydrogen is effected. In order to ensure electrical contact between hydrogen absorbing alloy particles of this size, it is a necessity that the average particle diameter of conductive powder present with the alloy particles be 10 μm or less. If it is over 10 μm, the particles are the same size as or larger than the hydrogen absorbing alloy particles, thus the electrochemical capacity becomes insufficient not only for the electrode including a small amount of conductive powder since there are electrically isolated hydrogen absorbing alloy particles, including a large amount since the amount of hydrogen absorbing alloy particles that can be contained in a given volume of electrode is reduced though electrical contact is ensured. The size of the conductive particles is therefore restricted to 10 μm or less in average diameter by considerations of achieving satisfactory effects with respect to ensuring electrical contact between alloy particles with an average particle diameter of 20-30 μm while avoiding occupation of an excessive proportion of the overall volume of the electrode.

Materials that are suitable as this conductive powder include metal powders, activated carbon, acetylene black or similar carbon powder and powdered catalysts, etc.. A carbon powder or a catalyst supported on carbon powder is preferred since it has low specific gravity. Inclusion of a high specific gravity metal powder increases the weight of the electrode, but an inclusion of carbon powder, etc. causes only a slight increase in weight which can practically be ignored. The amount of conductive powder included varies depending on its type and particle diameter. In the case of carbon powder inclusion of 0.05-10 wt % of the electrode weight gives the effects noted above. Very fine carbon powder with an average particle diameter of 0.005-1 μm, in particular, is preferred, since it can give satisfactory effects with an inclusion of several wt % or less. Inclusion of this conductive powder also improves the high-rate charge-discharge characteristics, since it has the effect of lowering electrical resistance.

A negative electrode including the noble metal catalyst supported on the conductive particles as subsidiary material is also effective on preventing to rise the inner pressure in the rechargeable electrochemical cell in addition to increasing the capacity by ensuring an electrical mutual contact of the hydrogen absorbing alloy particles and the improvement of the high-rate charge-discharge characteristics because of lowering the electric resistance.

Oxygen gas is usually generated from the positive electrode in the electrochemical cell using the hydrogen absorbing alloy as the negative electrode and metalic oxide as the positive electrode if the cell is over charged. The internal pressure falls if the cell is discharged or kept open circuit for a longer time since oxygen gas reacts chemically with hydrogen on the surface of the negative electrode to produce water. Since the noble metal catalyst increases the rate of the reaction to combine with oxygen and hydrogen, gaseous oxygen is not produced even when the cell is charged, thus the inner pressure of the cell does not rise. If the cell containing the noble metal catalyst is extremely over-charged and gaseous oxygen is generated. the inner pressure can be suppressed to a lower level and falls quickly when the cell is discharged or kept open circuit. Therefore, a good stability of the cell can be achieved. Pt is the best noble metal because of its high catalytical activity. Rh, Ru are preferable and Ag, Au, etc. are also suitable.

DESCRIPTION OF THE PREFERRED EMBODIMENTS

Figure 1:
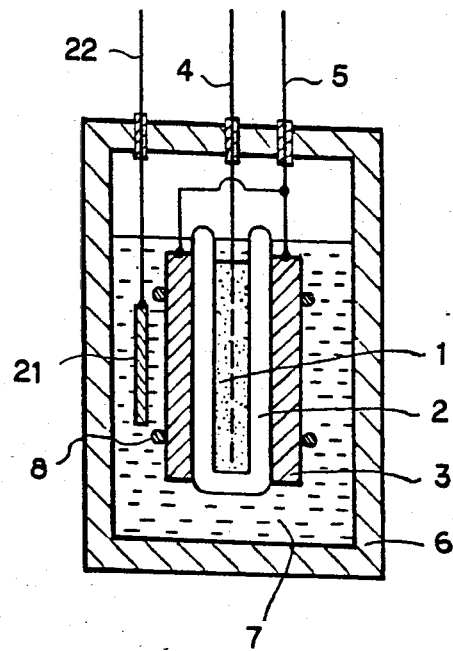
FIG. 1 is a schematic cross-section view of a cell according to one embodiment of the invention.

There now follows a detailed description of embodiments of rechargeable electrochemical cells according to the invention. The cells were manufactured by using the following negative electrodes and positive electrodes and their characteristics were observed.

(1) Negative electrode formation

Set amounts of the metals Ni, Co, Mn and Al and of a mixture M of rare earth elements prepared by molten salt electrolysis after partial removal of Ce from refined basnaesite ore (in which the Ce content was approximately 50% of the total amount of rare earth elements) were mixed and fused by arc melting in an argon atmosphere and the resulting uniform solid solutions were taken as sample material. The compositions of each sample material produced for different embodiments are noted together with those of comparison examples in Table 1. The solid solutions were ground to a diameter of about 6 mm and then introduced into a container connected to a vacuum pump and a hydrogen cylinder and, after holding for 1 hour at room temperature under vacuum of $10^{-3}$ Torr or less, fine pulverization was effected by introduction of hydrogen and holding for 1 to several hours at room temperature in a hydrogen atmosphere of about 10 kg/cm². After holding again under vacuum of $10^{-3}$ Torr or less for 1 hour or more in the range room temperature ~60° C. for degassing, the alloy powder was taken from the container. The average particle diameter of the resulting alloy powder was approximately 25 μm which was measured by taking an enlarging picture using SEM.

TABLE 1

| No. | Alloy composition | La | Pr | Nd | Sm | Ce | Life/cycle |
|---|---|---|---|---|---|---|---|
| | | \multicolumn{5}{c}{Contents of rare earth elements in M/wt %} | | |

| No. | Alloy composition | La | Pr | Nd | Sm | Ce | Life/cycle |
|---|---|---|---|---|---|---|---|
| Embodiment-examples | | | | | | | |
| 1 | $MNi_{4.2}Mn_{0.6}Al_{0.2}$ | 49.9 | 12.0 | 32.9 | 1.1 | 4.1 | 450 |
| 2 | $MNi_{4.2}Mn_{0.6}Al_{0.2}$ | 47.4 | 12.8 | 34.4 | 1.2 | 4.2 | 475 |
| 3 | $MNi_{4.2}Mn_{0.6}Al_{0.2}$ | 46.6 | 12.9 | 32.6 | 1.2 | 6.7 | 395 |
| 4 | $MNi_{4.2}Mn_{0.6}Al_{0.2}$ | 47.8 | 12.2 | 31.6 | 1.2 | 7.2 | 325 |
| 5 | $MNi_{4.2}Mn_{0.6}Al_{0.2}$ | 44.1 | 13.6 | 34.2 | 0.8 | 7.3 | 300 |
| 6 | $MNi_{4.2}Mn_{0.6}Al_{0.2}$ | 46.0 | 12.8 | 31.3 | 1.2 | 8.7 | 285 |
| 7 | $MNi_{4.2}Mn_{0.6}Al_{0.2}$ | 42.5 | 14.7 | 26.2 | 1.1 | 15.5 | 230 |
| 8 | $MNi_{3.2}Co_{1.0}Mn_{0.6}Al_{0.2}$ | 44.6 | 14.1 | 32.3 | 1.1 | 7.9 | 1315 |
| 9 | $Mni_{3.7}Co_{0.5}Mn_{0.6}Al_{0.2}$ | 41.7 | 14.5 | 32.5 | 1.1 | 10.2 | 825 |
| 10 | $Mni_{4.0}Co_{0.2}Mn_{0.6}Al_{0.2}$ | 42.9 | 14.0 | 28.9 | 1.0 | 13.2 | 426 |
| 11 | $Mni_{4.4}Co_{0.2}Mn_{0.3}Al_{0.3}$ | 46.2 | 11.5 | 35.1 | 1.0 | 6.2 | 790 |
| 12 | $Mni_{4.4}Co_{0.2}Mn_{0.3}Al_{0.3}$ | 45.2 | 12.1 | 37.0 | 1.1 | 4.6 | 1000 |
| 13 | $Mni_{4.4}Co_{0.2}Mn_{0.3}Al_{0.3}$ | 91.5 | 5.2 | 1.0 | 0.1 | 2.2 | 460 |
| 14 | $Mni_{4.4}Co_{0.2}Mn_{0.3}Al_{0.3}$*1 | 45.2 | 12.1 | 37.0 | 1.1 | 4.6 | 1110 |
| 15 | $Mni_{4.4}Co_{0.2}Mn_{0.3}Al_{0.3}$*2 | 45.2 | 12.1 | 37.0 | 1.1 | 4.6 | 1210 |
| 16 | $Mni_{4.4}Co_{0.2}Mn_{0.3}Al_{0.3}$*1 | 91.5 | 5.2 | 1.0 | 0.1 | 2.2 | 470 |
| Comparison-examples: | | | | | | | |
| 1 | $MNi_{4.2}Mn_{0.6}Al_{0.2}$ | 32.9 | 7.1 | 19.0 | 1.0 | 40.0 | 140 |
| 2 | $Mni_{4.4}Co_{0.2}Mn_{0.3}Al_{0.3}$ | 26.3 | 15.4 | 14.3 | 0.7 | 43.3 | 460 |
| 3 | $Mni_{4.0}Co_{0.2}Mn_{0.6}Al_{0.2}$ | 26.5 | 15.3 | 14.2 | 0.7 | 43.3 | 350 |

Note:
*1 = including carbon powder.
*2 = including Pt supported on carbon powder.

For Embodiment-examples 1–13 and Comparison Examples 1–3 in Table 1, the alloy powder and polytetrafluoroethylene (PTFE) were taken in the weight ratio 96:4 in the dry state, mixed and formed into sheets 0.5 mm thick. The weight ratio of the alloy powder and PTFE in the dry state was 96:4.

For Embodiment-examples 14–16 in Table 1, the alloy powder, PTFE powder as binder and carbon powder with an average particle diameter of 0.03 μm as conductive powder were mixed in the weight ratio 95.5:4:0.5, and then kneaded and made into sheets 0.5 mm thick. For Embodiment-example 15, conductive powder was a Pt catalyst supported on the carbon powder with average particle diameter of 0.03 μm whose Pt content was 10 wt % relative to the carbon powder. This catalyst powder was prepared as follows: the commercial carbon powder was impregnated with Pt in $H_2PtCl_6$ solution, dryed, and Pt was reduced in hydrogen atmosphere at high temperature. SEM pictures of the sheets of Embodiment-examples 14–16 show that the binder became fibriform and held the hydrogen absorbing alloy particles which were connected by the fine carbon particles.

A sheet of nickel net was put between the two sheets that had been produced as described above and pressed to form a 0.7 mm thick electrode which was used as a negative electrode.

(2) Positive electrode formation

A positive electrode was a conventional nickel hydroxide electrode whose active material was precipitated in the pores of a sintered nickel plate by impregnation.

(3) Cell manufacture

Rechargeable cells with a structure as shown in FIG. 1 were produced using the above negative electrodes and positive electrodes, together with separators constituted by 0.3 mm thick polypropylene nonwoven cloth and an 8 mol/1 KOH aqueous solution as the electrolyte.

In FIG. 1, 1 is a negative electrode and 3 is a positive electrode. 4 and 5 are conductors of negative electrode and positive electrode, respectively, which are electrically insulated of the cell container 6. 7 is the electrolyte. Separator 2 encloses the negative electrode in a U shape and positive electrodes 3 are positioned on opposite sides of it and held firmly contact by acrylic holders 8. The electrochemical capacity of positive electrode so that the cell performance was determined by the negative electrode characteristics, in order to permit accurate measurement of the performance of the negative electrode in this cell according to the invention. For Embodiment-examples 12–16 in Table 1, a reference electrode 21 made of $Cd/Cd(OH)_2$ was introduced into the container 6 and immersed in the electrolyte 7 in order to permit measurement of the negative electrode potential which could be obtained as the voltage of the conductor 4 vs. the conductor 22.

(4) Measurement of cell characteristics

Each of the cells constructed in the abovedescribed manner for the embodiment and comparison examples was subjected to change-discharge cycles in which it was given a charge of 0.17 Ah per 1 g of hydrogen absorbing alloy contained in the negative electrode per cycle. In the initial period, all the cells displayed a large capacity characteristics giving 100% of charge-discharge efficiency, that is 0.17 $Ahg_{-1}$ of discharged capacity, but the discharge capacity eventually fell with repetition of the charge-discharge cycles. In the measurements made in this case, the number of cycles at which the discharged capacity fell to 80% was taken to be the rechargeable cell's life.

The characteristics of the embodiment-examples and comparison examples determined in these measurements are given in Table 1 as life/cycle values.

Embodiment-examples 1–7 and Comparison-example 1 in Table 1 are examples of cells manufactured using a negative electrode composed from a hydrogen absorbing alloy with the composition $MNi_{4.2}Mn_{0.6}Al_{0.2}$. The contents of the rare earth elements in M are as noted in Table 1 and the correlation between the Ce content and cell life performance is plotted in FIG. 2.

Figure 2:
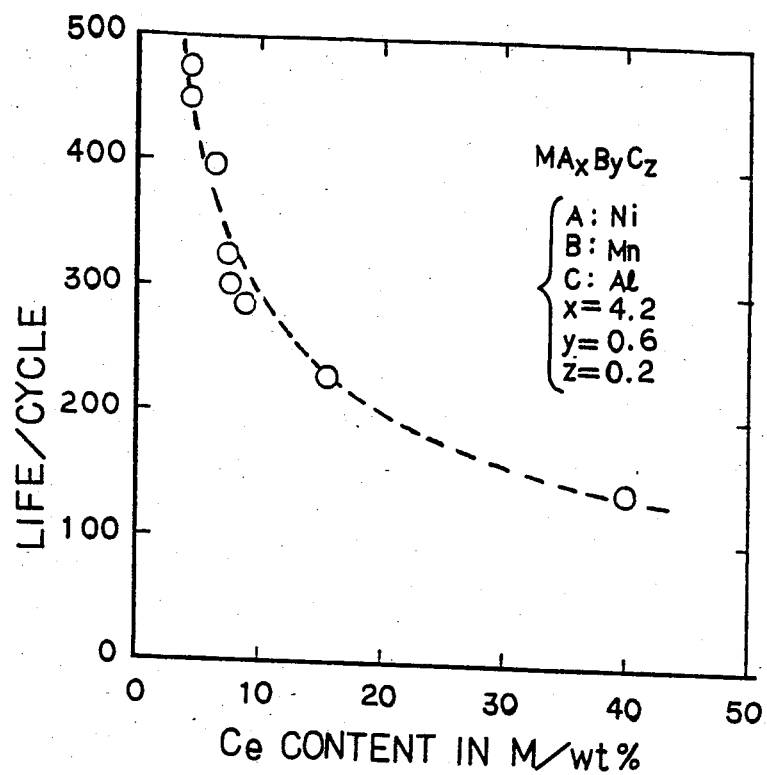
FIG. 2, FIG. 3 and FIG. 6 are characteristic plots showing the relation between life/cycle and the Ce content in a rare earth component M/wt % in the embodiment of the invention and in a comparison example.

It is seen from Table 1 and FIG. 2 that the cell life characteristic is improved if the Ce content in M is less than 40 wt %. Further, it is improved markedly when the content is decreased to beyond 12 wt % and still more when it is less than 8 wt %.

Figure 3:
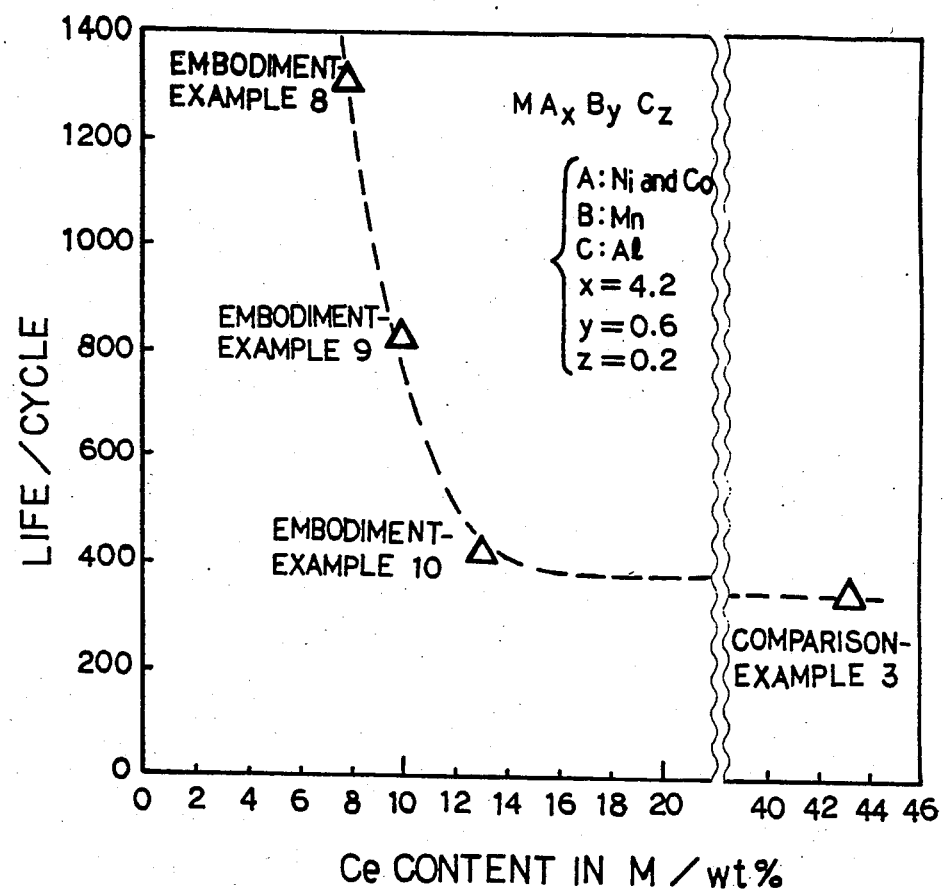

Embodiment-examples 8–10 and Comparison-example 3 in Table 1 are examples of the cells manufactured using hydrogen absorbing alloys representable by the formula $MA_xB_yC_z$ in which Ni and Co are used for A, Mn is used for B, Al is used for C, x is made 4.2, y is made 0.6 and z is made 0.2. The contents of the rare earth elements in M also are as noted in Table 1. The cell life characteristic is improved if the Ce content is less than 40 wt % and, as seen in FIG. 3, it is improved markedly when the content is decreased to beyond 12 wt % and still more when it is less than 8 wt %.

Embodiment-examples 11, 12 and 13 and Comparison-example 2, the cells are manufactured using hydrogen absorbing alloys representable by the formula $MNi_qCo_rMn_sC_t$ in which Al is used as element C and q=4.4, r=0.2, s=0.3 and t=0.3. The materials used that have the same compositions apart from the rare earth component M. With these alloys, the cell life is also long in all cases when Ce is less than 40 wt %, and in Embodiment-example 12 in particular, with the alloy with the Ce content in M small at 4.6 wt %, the cell has an excellent life characteristic of 1,000 cycles.

Figure 4:
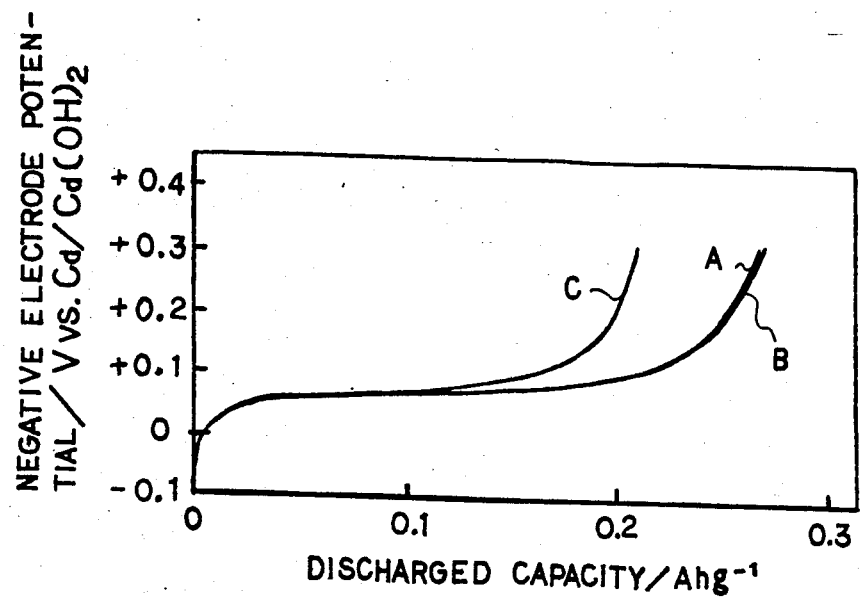
FIG. 4 and FIG. 5 are characteristic plots showing the relation between potential on the negative electrode of the cell/V versus $Cd/Cd(OH)_2$ and discharge capacity/$Ahg^{-1}$ in embodiments of the invention.
Figure 5:
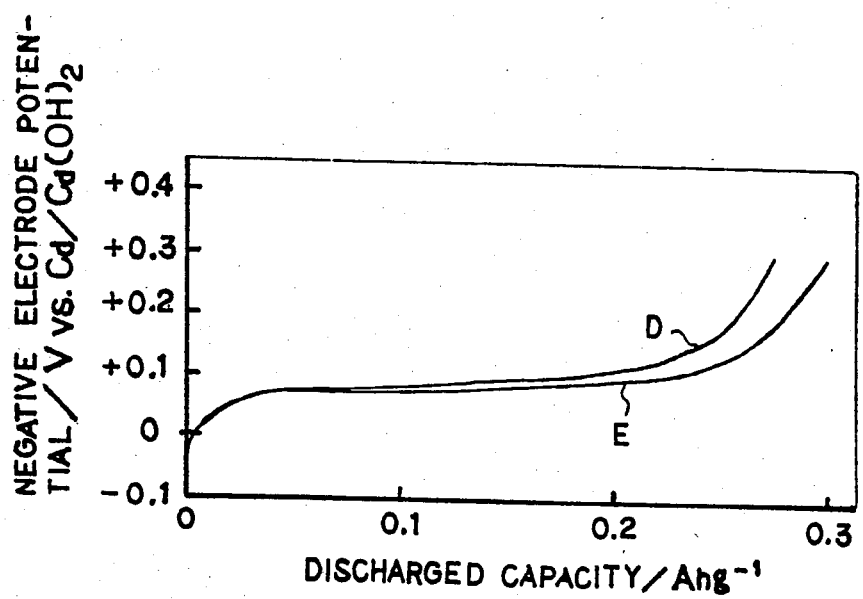

The discharge characteristics on the 20th cycle of repeated charge-discharge at a current density of 0.17 A per 1 g of hydrogen absorbing alloy contained in the negative electrode are shown by curves A, B and C respectively in FIG. 4 for cells of Embodiment-examples 14, 15 and 12 in Table 1. The charged capacity was the same as the theoretical capacity of the hydrogen absorbing alloy contained in the electrode. The characteristic plot of FIG. 5 is a representation in which the abscissa is the discharged capacity per 1 g of alloy and the ordinate is the negative electrode potential relative to the reference electrode 21. It is seen from curve A (Embodiment-example 14) and curve B (Embodiment-example 15) that the cells of Embodiment-examples 14 and 15 have a large capacity of about 0.27 $Ahg_{-1}$.

As shown in Table 1, in life tests, Embodiment-examples 14 and 15 displayed long lives of 1,100 cycles and 1,210 cycles respectively. Comparing these results with Embodiment-example 12, whose negative electrode has an hydrogen absorbing alloy with the same composition as its main material, the electrochemical capacity is greater and the cycle life is longer with Embodiment-examples 14 and 15, which contain conductive powder with an average particle diameter of 0.03 $\mu$m. In other words, inclusion of conductive powder with an average particle diameter of 10 $\mu$m or less as in the invention effectively maintains electrical contact between hydrogen absorbing alloy particles in the electrode and greatly improves the electrochemical capacity of the electrode. This effect can be seen as differences in discharge characteristics that are shown in FIG. 4 as the differences between the curves A, B and C. The differences in life characteristics of these cells are because the current density to the hydrogen absorbing alloy particles used effectively is greater in Embodiment-example 12, which does not contain conductive powder, than it is in Embodiment-examples 14 and 15, since current cannot flow in electricaly isolated hydrogen absorbing alloy particles.

Both Embodiment-example 13 and Embodiment-example 16 are cells with negative electrodes whose main material is a hydrogen absorbing alloy in which the Ce content in M is only 2.2 wt %. The negative electrode of Embodiment-example 16 also contains carbon powder as supplementary material.

Figure 6:
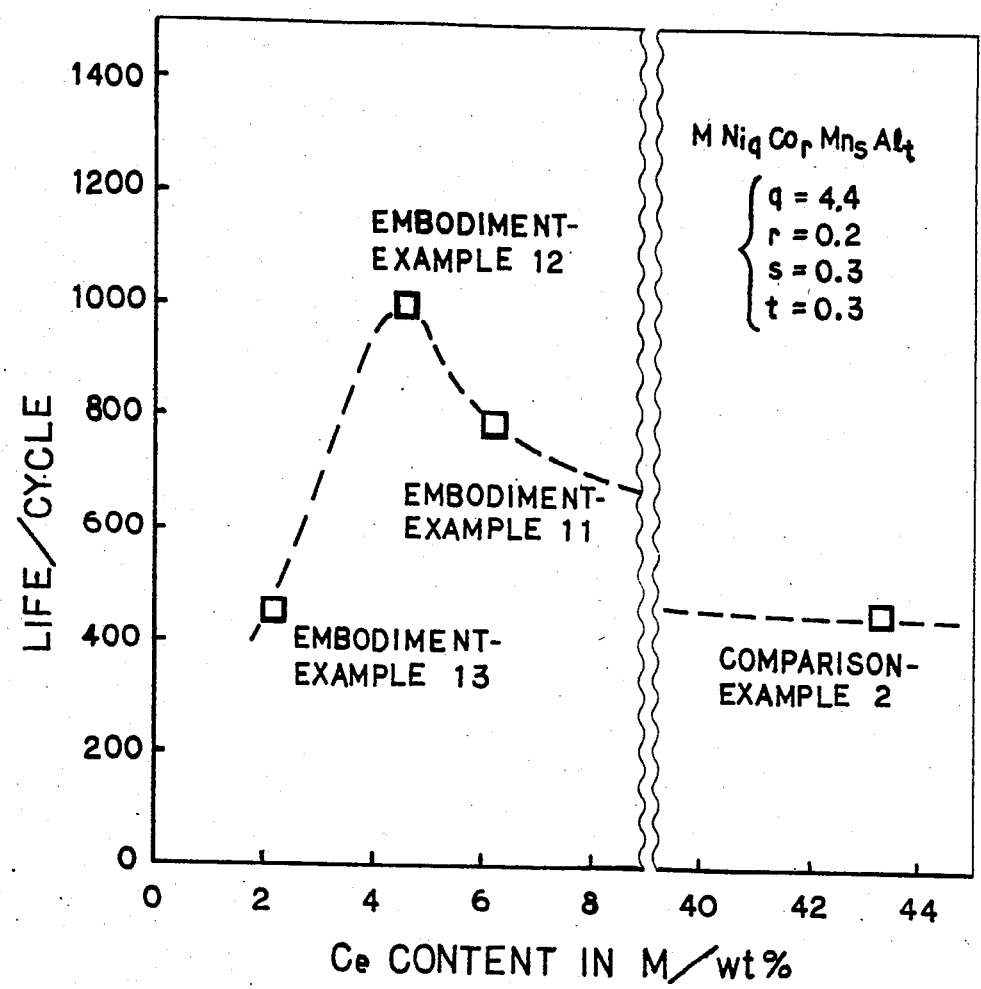

Curves D and E in FIG. 5 show the discharge characteristics of Embodiment-examples 13 and 16 respectively, that were measured in the same way as for the abovenoted Embodiment-examples 12, 14 and 15. FIG. 5 indicates that the cell of Embodiment-example 13 has a large discharged capacity of about 0.27 $Ahg^{-1}$, while that of Embodiment-example 16 has an even larger capacity of about 0.30 $Ahg^{-1}$. As regards the life characteristics shown in Table 1, the lives of Embodiment-examples 13 and 16 are shorter than those of Embodiment-example 11 or 12 though they are more than 400 cycles. The relation between these Embodiment-examples 11, 12 and 13 is shown in FIG. 6. Thus, if the Ce content in M is too small, the cycle life of the cell becomes shorter, however, such a cell has the advantage of very large capacity, as seen from curves D and E in FIG. 5.

Therefore, with a cell according to the invention, it is possible to design a rechargeable cell with desired properties by deciding on the necessary capacity and life characteristics, taking aspects such as above into account, and going on the basis of these decisions to select the hydrogen absorbing alloy composition and conductive material that constitute the negative electrode. As far as regards the content of Ce in M, however, there is marked deterioration, first of the life characteristic and then of the capacity characteristic, if the amount is 40 wt % or more.

While if it is less than 0.1 wt %, the advantages of the invention fail to be achieved, since there is a marked deterioration of the life characteristic.

Figure 7:
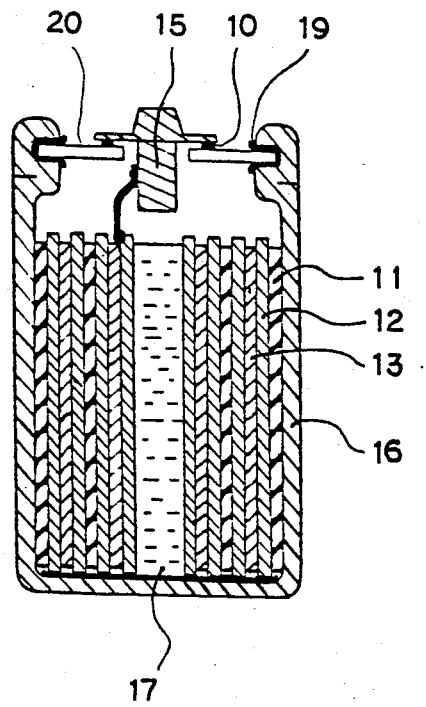
FIG. 7 is a schematic cross-sectional view of another example of the structure of a cell according to an embodiment of the invention.

Other Embodiment-example 17 and 18 were cells having the negative electrodes which contained the hydrogen absorbing alloy with the same composition as that used for Embodiment-examples 12 and 15 and were prepared in the same way as described above. The sheet of the negative electrodes of Embodiment-examples 17 and 18 had a weight of 7 g. Embodiment-example 18 included the same conductive powder as used for Embodiment-example 15. Then, sealed secondary cells with a spiral-shaped electrode structure as shown in FIG. 7 were made using positive electrodes, separators and electrolyte as in Embodiment-examples 1–16. In more detail, a negative electrode 11, separator 12 and a positive electrode 13 were wound together in a spiral shape and put into a cell container 16 together with electrolyte 17, and sealing was effected with an insulating gasket and an O-ring 10. Positive electrode 13 was connected to an electrode terminal 15 by a lead wire and the negative electrode 11 was connected to cell container 16, which also served as an electrode terminal. These terminals made possible to measure an e.m.f. of the cell. The capacity of the positive electrode was made equal to or less than that of the negative electrode. Although not shown in FIG. 7, a pressure sensor was mounted on a portion of the top plate 20 of container 16 to measure the internal pressure of the cell.

Figure 8:
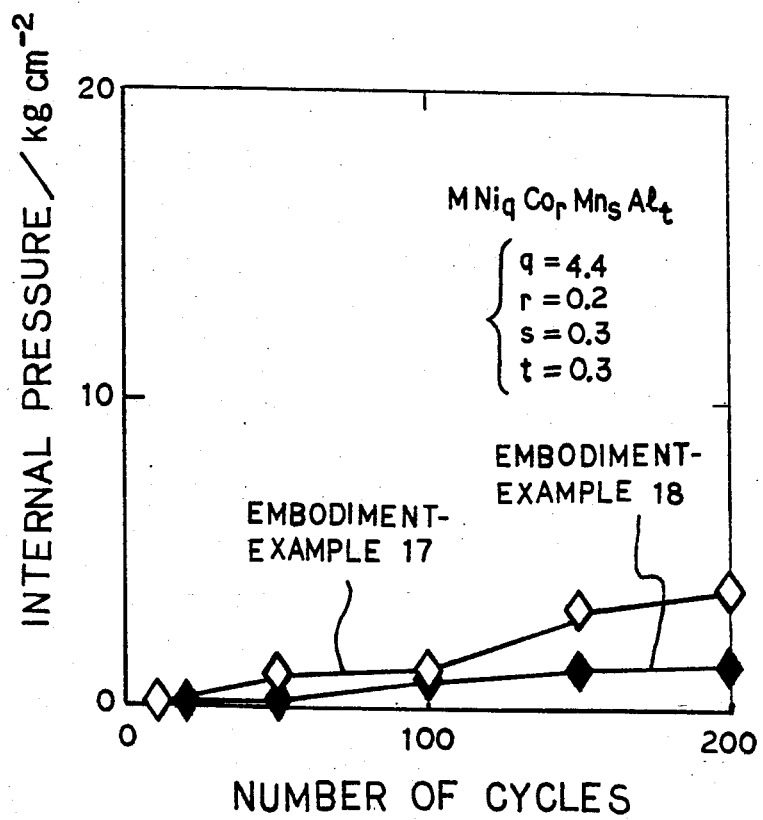
FIG. 8 is a graph showing the relation between maximum internal pressure and the number of charge discharge cycles in embodiment of the invention.

Embodiment-examples 17 and 18 were subjected to charge-discharge cycles with a charged capacity of 0.8 Ah and, as seen in FIG. 8, measurements of the internal pressure of the cells showed that in both embodiments the maximum internal pressure at the end of charge was kept low for up to as many as 200 cycles. It is seen from FIG. 8 that Embodiment-example 18, which had a negative electrode containing a conductive powder as a subsidiary material, was superior, as its maximum internal pressure was less than 2 kgcm$^{-2}$ even when the number of charge-discharge cycles reached 200.

Therefore, according to the invention, an electrochemical rechargeable cell has a long cycle life if it has a negative electrode using as the main material a hydrogen absorbing alloy with a suitable composition containing a set amount of Ce. Further, both large capacity and long life characteristics are obtained if the cell includes a conductive powder with an average article diameter of 10 μm or less as subsidiary material. Moreover, cell thus constituted have the excellent advantages of the prevention of rise of internal pressure in the cell container, that of hydrogen leakage and a characteristic of slow self-discharge, that are required of sealed secondary cells.

We claim:

1. A rechargeable electrochemical cell comprising a positive electrode, an alkaline electrolyte and a negative electrode made of a hydrogen absorbing alloy containing a rare earth component consisting of a mixture of at least two rare earth elements including Ce; characterized in that the amount of Ce contained in said hydrogen absorbing alloy is less than 40% by weight relative to the total amount of rare earth elements.

2. Rechargeable electrochemical cell as claimed in claim 1, wherein said rare earth component is a mixture of rare earth elements prepared from mischmetal from which Ce has been partially removed to make the Ce content less than 40% by weight relative to the total amount of the rare earth elements.

3. Rechargeable electrochemical cell as claimed in claim 2, wherein the Ce content of a mixture of rare earth elements is from 0.1% by weight to 12% by weight relative to the total amount of rare earth elements.

4. Rechargeable electrochemical cell as claimed in claim 3, wherein the Ce content of said mixture of rare earth elements is from 0.1% by weight to 8% by weight relative to the total amount of rare earth elements.

5. Rechargeable electrochemical cell as claimed in claim 1, wherein the component element apart from said rare earth component is one or both the elements Ni and Co.

6. Rechargeable electrochemical cell as claimed in claim 1, wherein the component elements apart from said rare earth component include one or both the elements Ni and Co and comprise at least one of the elements Cu, Fe, and Mn.

7. Rechargeable electrochemical cell as claimed in claim 1, wherein said negative electrode is constituted using as main material a hydrogen absorbing alloy with a composition representable by the formula $$MNi_uCo_vMn_w$$

where M is the rare earth component, Ni, Co and Mn are elements other than said rare earth component and u, v and w represent atomic quantities per 1 gram atom of the rare earth component M and are figures that satisfy the following relations.

$2.2 \leq u \leq 4.8$ $0.01 < v \leq 1.5$ $0.01 < w \leq 1.2$ $4.8 \leq u+v+w \leq 5.4$.

8. Rechargeable electrochemical cell as claimed in claim 7, wherein said rare earth component is a mixture of rare earth elements prepared from mischmetal from which Ce has been partially removed to make the Ce content less than 40% by weight relative to the total amount of the rare earth elements.

9. Rechargeable electrochemical cell as claimed in claim 8, wherein the Ce content of a mixture of rare earth elements is from 0.1% by weight to 12% by weight relative to the total amount of rare earth elements.

10. Rechargeable electrochemical cell as claimed in claim 9, wherein the Ce content of said mixture of rare earth elements is from 0.1% by weight to 8% by weight relative to the total amount of rare earth elements.

11. Rechargeable electrochemical cell as claimed in claim 3, wherein the component elements apart from said rare earth component include one or both the elements Ni and Co and at least one of the elements Cu, Fe and Mn and comprise at least one of the elements Al, Cr, Si, Ti, V and Sn.

12. Rechargeable electrochemical cell as claimed in claim 1, wherein said negative electrode is constituting using as main material a hydrogen absorbing alloy with a composition which, designating said rare earth component as M, one or both the elements Ni and Co as A, at least one of the elements Cu, Fe and Mn as B and at least one of the elements Al, Cr, Si, Ti, V and Sn as C, is representable by the formula $$M A_xB_yC_z$$

where x, y and z represent atomic quantities per 1 gram atom of the rare earth component M and are figures that satisfy the following relations $2.2 \leq x \leq 4.8$ $0.01 < y \leq 2.0$ $0.01 < z \leq 0.6$ $4.8 \leq x+y+z \leq 5.4$.

13. Rechargeable electrochemical cell as claimed in claim 12, wherein said rare earth component is a mixture of rare earth elements prepared from mischmetal from which Ce has been partially removed to make the Ce content less than 40% by weight relative to the total amount of the rare earth.

14. Rechargeable electrochemical cell as claimed in claim 13, wherein the Ce content of a mixture of rare earth elements is from 0.1% by weight to 12% by weight relative to the total amount of rare earth elements.

15. Rechargeable electrochemical cell as claimed in claim 14, wherein the Ce content of said mixture of rare earth elements is from 0.1% by weight to 8% by weight relative to the total amount of rare earth elements.

16. Rechargeable electrochemical cell as claimed in claim 1, wherein said negative electrode is constituting using as main material a hydrogen absorbing alloy with a composition which, designating said rare earth component as M and at least one of the elements Al, Cr, Si, Ti, V and Sn as C, is representable by the formula $$MNi_qCo_rMn_sC_t$$

where q, r, s and t represent atomic quantities per 1 gram atom of the rare earth component M and are figures that satisfy the following relations $$3.5 < q \leq 4.6$$

$$0.01 < r \leq 1.5$$

$$0.01 < s \leq 1.2$$

$$0.01 < t \leq 0.6$$

$$x = q + r$$

$$3.51 < x \leq 4.8$$

$$4.8 \leq q + r + s + t \leq 5.2.$$

17. Rechargeable electrochemical cell as claimed in claim 16, wherein said rare earth component is a mixture of rare earth elements prepared from mischmetal from which Ce has been partially removed to make the Ce content less than 40% by weight relative to the total amount of the rare earth elements.

18. Rechargeable electrochemical cell as claimed in claim 17, wherein said Ce content of a mixture of rare earth elements is from 0.1% by weight to 12% by weight relative to the total amount of rare earth elements.

19. Rechargeable electrochemical cell as claimed in claim 16, wherein the Ce content of said mixture of rare earth elements is from 0.1% by weight to 8% by weight relative to the total amount of rare earth elements.

20. Rechargeable electrochemical cell as claimed in claim 16, wherein Al is selected as said element C.

21. Rechargeable electrochemical cell as claimed in claim 20, wherein said rare earth component is a mixture of rare earth elements prepared from mischmetal from which Ce has been partially removed to make the Ce content less than 40% by weight relative to the total amount of the rare earth elements.

22. Rechargeable electrochemical cell as claimed in claim 21, wherein a mixture of rare earth elements the Ce content of is from 0.1% by weight to 12% by weight relative to the total amount of rare earth elements.

23. Rechargeable electrochemical cell as claimed in claim 22, wherein the Ce content of said mixture of rare earth elements is from 0.1% by weight to 8% by weight relative to the total amount of rare earth elements.

24. Rechargeable electrochemical cell as claimed in claim 1, which possesses a negative electrode containing conductive powder with an average particle diameter of 10 μm or less as a subsidiary material.

25. Rechargeable electrochemical cell as claimed in claim 24, wherein said conductive powder is carbon powder.

26. Rechargeable electrochemical cell as claimed in claim 25, wherein the average particle diameter of said carbon powder is from 0.005 μm to 1 μm.

27. Rechargeable electrochemical cell as claimed in claim 24, wherein metal particles which are noble metal particles are supported on the surface of said conductive powder.

28. Rechargeable electrochemical cell as claimed in claim 27 wherein said noble metal particles are Pt particles.

29. Rechargeable electrochemical cell as claimed in claim 16, wherein said Ce content is from 0.1% by weight to 12% by weight relative to the total amount of said rare earth elements M and wherein said negative electrode contains conductive powder with an average particle diameter of 10 μm or less as subsidiary material.

30. Rechargeable electrochemical cell as claimed in claim 29, wherein said rare earth component is a mixture of rare earth elements prepared from mischmetal from which Ce has been partially removed to make the Ce content from 0.1% by weight to 12% by weight relative to the total amount of rare earth elements.

31. Rechargeable electrochemical cell as claimed in claim 30, wherein Al is selected as said element C.

32. Rechargeable electrochemical cell as claimed in claim 31, wherein the Ce content in said mixture of rare earth elements is from 0.1% by weight to 8% by weight relative to the total amount of rare earth elements.

33. Rechargeable electrochemical cell as claimed in claim 29, wherein metal particles which are noble metal particles are supported on the surface of said conductive powder.

34. Rechargeable electrochemical cell as claimed in claim 33, wherein said noble metal particles are Pt particles.

35. Rechargeable electrochemical cell as claimed in claim 16, wherein said Ce content is from 0.1% by weight to 12% by weight relative to the total amount of rare earth elements M, Al is selected as said element C and that contains conductive powder with an average particle diameter from 0.005 μm to 1 μm as subsidiary material.

36. Rechargeable electrochemical cell as claimed in claim 35, wherein said rare earth component is said mixture of rare earth elements prepared from mischmetal from which Ce has been partially removed to make the Ce content from 0.1% by weight to 12% by weight relative to the total amount of rare earth elements.

37. Rechargeable electrochemical cell as claimed in claim 36, wherein the Ce content of said a mixture of rare earth elements is from 0.1% by weight to 8% by weight relative to the total amount of rare earth elements.

38. Rechargeable electrochemical cell as claimed in claim 35, wherein noble metal particles are supported on the surface of said conductive powder.

39. Rechargeable electrochemical cell as claimed in claim 38, wherein said metal particles which are noble metal particles are Pt particles.

* * * * *